(12) United States Patent
Mola

(10) Patent No.: US 11,442,842 B2
(45) Date of Patent: Sep. 13, 2022

(54) EXPOSING MEMORY-BACKED OBJECTS AS QUERYABLE MEMORY RESOURCES

(71) Applicant: Microsoft Technology Licensing, LLC, Redmond, WA (US)

(72) Inventor: Jordi Mola, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 661 days.

(21) Appl. No.: 16/425,018

(22) Filed: May 29, 2019

(65) Prior Publication Data

US 2020/0379883 A1    Dec. 3, 2020

(51) Int. Cl.
*G06F 11/00*  (2006.01)
*G06F 11/36*  (2006.01)
*G06F 16/2455*  (2019.01)

(52) U.S. Cl.
CPC ...... *G06F 11/3636* (2013.01); *G06F 16/2455* (2019.01)

(58) Field of Classification Search
CPC ............ G06F 11/3476; G06F 11/3461; G06F 11/3612; G06F 11/3636; G06F 11/3664
See application file for complete search history.

(56) References Cited

U.S. PATENT DOCUMENTS

| | | |
|---|---|---|
| 6,658,652 B1 | 12/2003 | Alexander et al. |
| 9,934,126 B1 | 4/2018 | Mola et al. |
| 9,983,978 B1 | 5/2018 | Mola et al. |
| 2009/0006064 A1* | 1/2009 | Lin .......................... G06F 30/20 703/13 |
| 2018/0067832 A1* | 3/2018 | Suzuki .................... G06F 11/28 |

OTHER PUBLICATIONS

"International Search Report and Written Opinion Issued in PCT Application No. PCT/US2020/029172", dated Jul. 30, 2020, 13 Pages.

* cited by examiner

*Primary Examiner* — Charles Ehne
(74) *Attorney, Agent, or Firm* — Workman Nydegger

(57) ABSTRACT

This disclosure relates to the use of execution traces to process queries against objects over their lifetime. Embodiments identify, from a trace, a memory-backed object that existed during a prior execution of an entity. A handle for logically representing memory covered by the object over the object's lifetime is identified. A plurality of associations that are represented by the handle are identified. These associations identify memory addresses that were covered by the object over its lifetime. Each association represents at least (i) a memory address that was covered by the object during its lifetime, and (ii) an execution time during the object's lifetime at which the memory address was covered by the object. A query is processed against the handle. The query includes a query based on an execution time, and processing the query includes comparing the execution time in the query to execution time(s) represented in the associations.

20 Claims, 7 Drawing Sheets

EXPOSING MEMORY-BACKED OBJECTS AS QUERYABLE MEMORY RESOURCES

CROSS-REFERENCE TO RELATED APPLICATIONS

Not Applicable.

BACKGROUND

Tracking down and correcting undesired software behaviors in software code, often referred to as "debugging" code, is a core activity in software development. Undesired software behaviors can include many things, such as execution crashes, runtime exceptions, slow execution performance, incorrect data results, data corruption, and the like. Undesired software behaviors might be triggered by a vast variety of factors such as data inputs, user inputs, race conditions (e.g., when accessing shared resources), etc. Given the variety of triggers, undesired software behaviors can be rare and seemingly random, and extremely difficult reproduce. As such, it can be very time-consuming and difficult for a developer to identify a given undesired software behavior. Once an undesired software behavior has been identified, it can again be time-consuming and difficult to determine its root cause (or causes).

One approach developers have used to debug code is to use "live" debuggers. In general, a live debugger attaches to a live process's execution and enables a developer to monitor and guide that process's forward execution. For example, a live debugger may enable a developer to set a breakpoint that pauses the program's execution when it reaches particular instruction, to set a watchpoint that pauses the program's execution when it accesses a particular memory addresses, to single-step through lines of code as it executes, etc.

An emerging form of diagnostic tools enable "historic" debugging (also referred to as "time travel" or "reverse" debugging), in which the execution of at least a portion of one or more of a program's threads is recorded/traced into one or more trace files (i.e., an execution trace). Using some tracing techniques, a trace can contain very high-fidelity "bit-accurate" historic trace data, which enables the recorded portion or portions of a traced thread to be virtually "replayed" at great fidelity—even down to the granularity of individual instructions (e.g., machine code instructions, intermediate language code instructions, etc.). Thus, using bit-accurate trace data, a "time travel" debugger enables a developer to not only monitor and guide a forward emulation of traced code (e.g., via breakpoints, watchpoints, single-stepping, etc.), but to also monitor and guide a reverse emulation of traced code (e.g., via reverse breakpoints, reverse watchpoints, reverse single-stepping, etc.). Thus, a developer can monitor and guide execution of any part of a programs prior trace.

Existing historic debugging tools expose memory as a flat structure, much as in live debugging. This means that a debugger may present memory state at each given traced execution time point.

BRIEF SUMMARY

At least some embodiments described herein leverage the rich nature of execution traces to expose memory-backed objects as queryable memory resources. In particular, embodiments expose memory-backed objects as handles that represent an object generally (including all of its allocated memory, over time), and not just an address that points to the object at any given time. Thus, the embodiments herein facilitate processing queries against these handles and/or queries that return these handles. These queries can determine what memory was covered by a given memory-backed object at any traced point in time, and over periods of time, to enable a great variety of queries against an object's memory as it dynamically changes during a lifetime of the object.

Some embodiments are directed to methods, systems, and computer program products for processing a query against a lifetime of a memory-backed object based on an execution trace. These embodiments, identify, from a trace of a prior execution of an entity, a memory-backed object that existed during the prior execution of the entity. These embodiments identify a handle for logically representing memory covered by the memory-backed object over a lifetime of the memory-backed object in the prior execution of the entity and identify a set of a plurality of associations that are represented by the handle. The set of associations identify a plurality of memory addresses that were covered by the memory-backed object over the lifetime of the memory-backed object. Each association represents at least (i) a memory address that was covered by the memory-backed object during the lifetime of the memory-backed object, and (ii) an execution time during lifetime of the memory-backed object at which the memory address was covered by the memory-backed object. These embodiments process, at least in part, a query against the handle. The query includes a least one query condition based on an execution time, and processing the query includes comparing the execution time in the query to one or more execution times represented in the set of associations. Based on processing the query, these embodiments formulating a response to the query.

In other embodiments, methods, systems, and computer program products for processing a query against a lifetime of a memory-backed object based on an execution trace include identifying, from a trace of a prior execution of an entity, a memory address that was used as part of the prior execution of the entity during at least one execution time. Based on receiving a query against the memory address, these embodiments identify at least one memory-backed object to which the memory address was associated during the at least one execution time, identify a handle for logically representing memory covered by the memory-backed object over a lifetime of the memory-backed object in the prior execution of the entity, and identify a set of a plurality of associations that are represented by the handle. The set of associations identify a plurality of memory addresses that were covered by the memory-backed object over the lifetime of the memory-backed object. Each association represents at least (i) a memory address that was covered by the memory-backed object during the lifetime of the memory-backed object, and (ii) an execution time during lifetime of the memory-backed object at which the memory address was covered by the memory-backed object. These embodiments process, at least in part, the query using the handle. The query includes a least one query condition based on an execution time. Processing the query includes comparing the execution time in the query to one or more execution times represented in the set of associations. Based on processing the query, these embodiments, formulate a response to the query.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

At least some embodiments described herein leverage the rich nature of execution traces to expose memory-backed objects as queryable memory resources. In particular, embodiments expose memory-backed objects as handles that represent an object generally (including all of its allocated memory, over time), and not just an address that points to the object at any given time. Thus, the embodiments herein facilitate processing queries against these handles and/or queries that return these handles. These queries can determine what memory was covered by a given memory-backed object at any traced point in time, and over periods of time, to enable a great variety of queries against an object's memory.

Figure 1A:
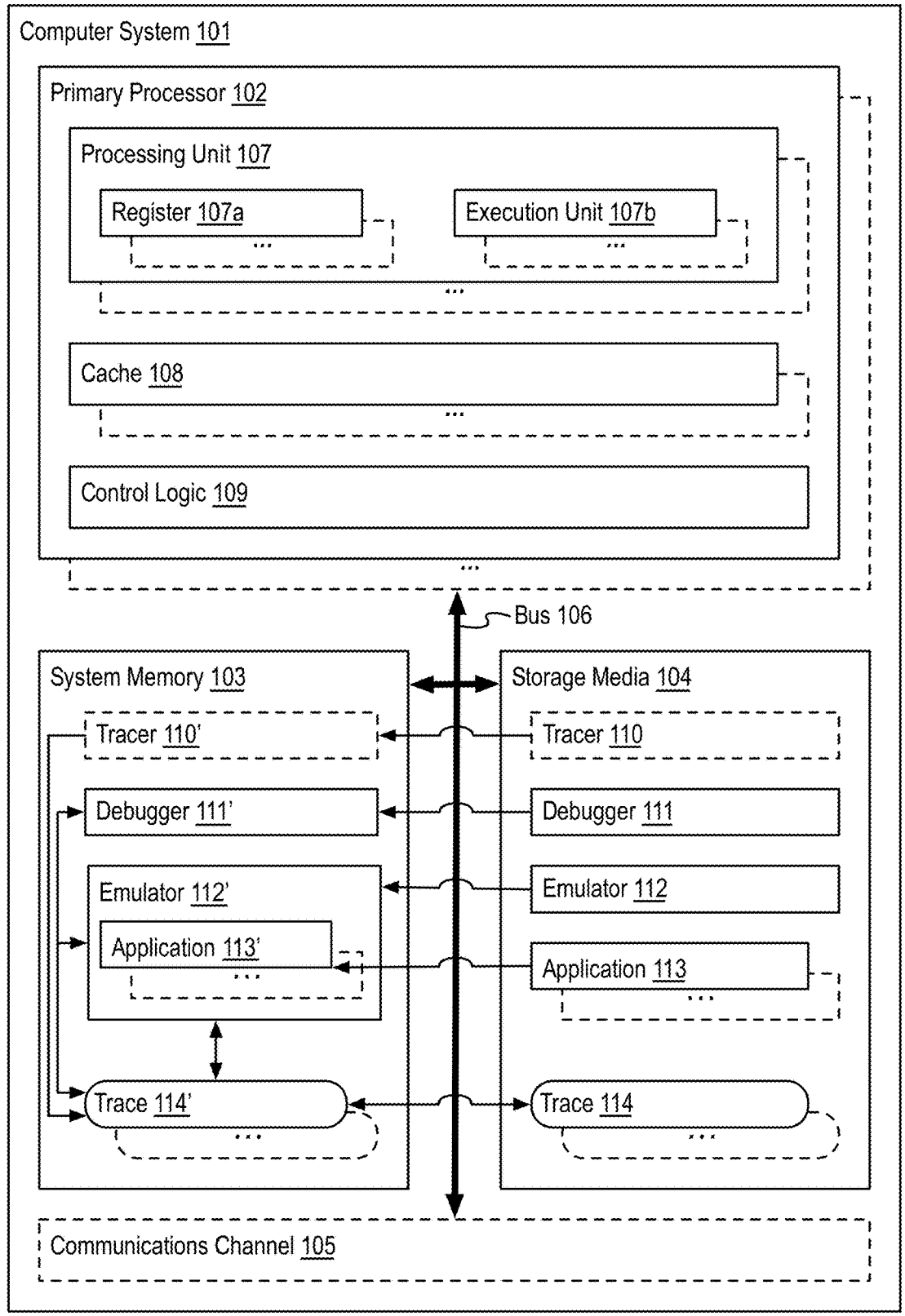
FIG. 1A illustrates an example computing environment that facilitates processing queries against the lifetimes of memory-backed objects, based on at least on an execution trace.

To the accomplishment of the foregoing, FIG. 1A illustrates an example computing environment 100a that facilitates processing queries against the lifetimes of memory-backed objects, based on at least on an execution trace. As depicted, computing environment 100a may comprise or utilize a special-purpose or general-purpose computer system 101, which includes computer hardware, such as, for example, at least one processor 102 (e.g., that is generally responsible for execution of application code), system memory 103 (e.g., that generally provides at least temporary data storage), one or more computer storage media 104 (e.g., for storing application code and/or data), and at least one external communications channel 105 (e.g., a network interface card, or even simply one or more wires/pins for communicating with one or more other computer systems).

In embodiments, each of the processor 102, the system memory 103, storage media 104, and communications channel 105 are communicatively coupled using at least one communications bus 106.

As shown in FIG. 1A, each processor 102 can include (among other things) one or more processing units 107 (e.g., processor cores) and at least one cache 108. Generally, each processing unit 107 loads and executes machine code instructions (e.g., of an application 113) via the cache 108. During execution of these machine code instructions at one more execution units 107b, the machine code instructions can use internal processor registers 107a as temporary storage locations and can read and write to various locations in system memory 103 via the cache 108. In embodiments, operation of each processor 102 is orchestrated, at least in part, by control logic 109. As will be appreciated by one of ordinary skill in the art, control logic 109 could comprise digital logic (e.g., a fixed arrangement of transistors; one or more programmed field programmable gate arrays; and the like), and/or stored executable instructions (e.g., processor microcode) that are executable by one or more components of the processor 102.

Returning to cache 108, the cache 108 temporarily caches portions of data stored in the system memory 103; for example, a cache 108 might include a "code" portion that caches portions of system memory 103 storing application code (e.g., of an application 113), and a "data" portion that caches portions of system memory 103 storing application runtime data. If a processing unit 107 requires data (e.g., code or application runtime data) not already stored in the cache 108, the processing unit 107 can initiate a "cache miss," causing the needed data to be fetched from a backing store (e.g., system memory 103, another cache, etc.). For example, in FIG. 1A, the backing store for cache 108 might be system memory 103, so a cache miss in cache 108 might be served by system memory 103. At times, data may be "evicted" from the cache 108 back to its backing store (e.g., system memory 103), such as when data is no longer needed in the cache 108, or when more urgent data is needed in the cache.

Figure 2:
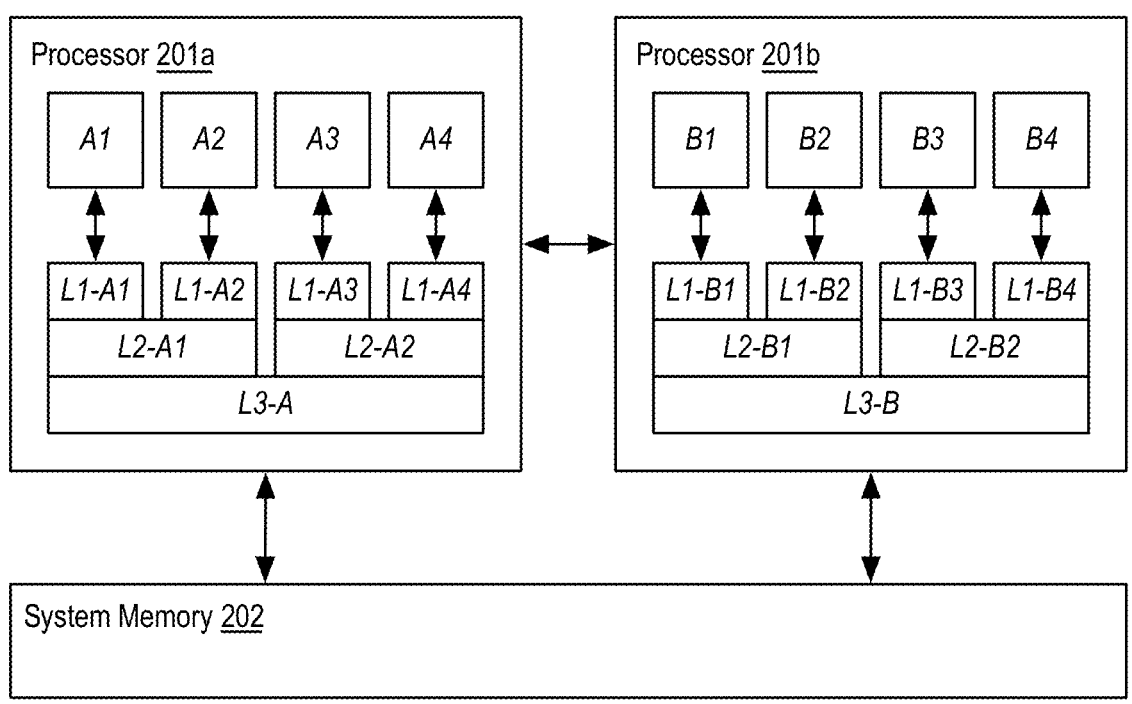
FIG. 2 illustrates an example computing environment including multi-layer caches.

While cache 108 might comprise a single cache, cache 108 might include multiple caches. To further explain this concept, FIG. 2 illustrates an example environment 200 demonstrating multi-layer caches. In FIG. 2, there are two processors 201a and 201b (e.g., each corresponding to a different processor 102 of FIG. 1A) and a system memory 202 (e.g., corresponding to system memory 103 of FIG. 1A). In the example environment 200, each processor 201 includes four physical processing units (i.e., processing units A1-A4 for processor 201a and processing units B1-B4 for processor 210b, which might each correspond to one of processing units 107 of FIG. 1A). In example environment 200, each processor 201 also includes (or is associated with) a three-layer cache hierarchy. Environment 200 is one example cache layout only, and it is not limiting to the cache hierarchies in which the embodiments herein may operate. In environment 200, each processing unit includes (or is associated with) its own dedicated L1 cache (e.g., L1 cache "L1-A1" in processor 201a for unit A1, L1 cache "L1-A2" in processor 201a for unit A2, etc.). Each processor 201 also includes (or is associated with) two L2 caches (e.g., L2 cache "L2-A1" in processor 201a that serves as a backing store for L1 caches L1-A1 and L1-A2, L2 cache "L1-A2" in processor 201a that serves as a backing store for L1 caches L1-A3 and L1-A4, etc.). Finally, each processor 201 also includes (or is associated with) a single L3 cache (e.g., L3 cache "L3-A" in processor 201a that serves as a backing store for L2 caches L2-A1 and L2-A2, and L3 cache "L3-B" in processor 201*b* that serves as a backing store for L2 caches L2-B1 and L2-B2). As shown, system memory 202 serves as a backing store for the L3 caches L3-A and L3-B. In this arrangement, and depending on cache implementation, cache misses in an L1 cache might by served by its corresponding L2 cache, its corresponding L3 cache, and/or system memory 202; cache misses in an L2 cache might by served by its corresponding L3 cache and/or system memory 202; and cache misses in an L3 cache might by served by system memory 202.

As demonstrated the arrows within each processing unit 201, when multiple cache layers are used, each processing unit might interact directly with the closest layer (e.g., L1), though this need not always be the case. In many implementations, data flows between the layers (e.g., an L3 cache interacts with the system memory 103 and serves data to an L2 cache, and the L2 cache in turn serves data to the L1 cache). When a processing unit 201 performs a write, the caches coordinate to ensure that those caches that have affected data that was shared among plural processing units don't have it anymore. This coordination is performed using a cache coherency protocol (CCP).

The caches in environment 200 may thus be viewed as "shared" caches. For example, each L2 and L3 cache serves multiple processing units within a given processor 201 and are thus shared by these processing units. The L1 caches with in a given processor 201, collectively, can also be considered shared—even though each one corresponds to a single processing unit—because the individual L1 caches may coordinate with each other (i.e., via a CCP) to ensure consistency (i.e., so that each cached memory location is viewed consistently across all the L1 caches). The L2 caches within each processor 201 similarly may coordinate via a CCP. Additionally, if the processor 201 supports hyper-threading, each individual L1 cache may be viewed being shared by two or more logical processing units and are thus "shared" even at an individual level.

As mentioned, when cache 108 includes multiple caches (as in FIG. 2) a processor 102 operates on the cache 108 according to one or more CCPs. In general, a CCP defines how consistency is maintained between the various caches as the various processing units 107 of one or more processors 102 read from and write to data in the various caches, and how to ensure that the various processing units 107 always read valid data from a given location in the caches. CCPs are typically related to, and enable, a memory model defined by the processor's instruction set architecture (ISA). Examples of popular ISA's include the x86 and x86_64 families of architectures from INTEL, and the ARM architecture from ARM HOLDINGS.

Examples of common CCPs include the MSI protocol (i.e., Modified, Shared, and Invalid), the MESI protocol (i.e., Modified, Exclusive, Shared, and Invalid), and the MOESI protocol (i.e., Modified, Owned, Exclusive, Shared, and Invalid). Each of these protocols define a state for individual locations (e.g., lines) in a shared cache (e.g., cache 108). A "modified" cache location contains data that has been modified in the shared cache and is therefore inconsistent with the corresponding data in the backing store (e.g., system memory 103 or another cache). When a location having the "modified" state is evicted from the shared cache, common CCPs require the cache to guarantee that its data is written back the backing store, or that another cache take over this responsibility. A "shared" cache location contains data that is unmodified from the data in the backing store, exists in read-only state, and is shared by plural processing units (e.g., two or more of processing units 107). The shared cache can evict this data without writing it to the backing store. An "invalid" cache location contains no valid data and can be considered empty and usable to store data from cache miss. An "exclusive" cache location contains data that matches the backing store and is used by only a single processing unit. It may be changed to the "shared" state at any time (i.e., in response to a read request) or may be changed to the "modified" state when writing to it. An "owned" cache location is shared by two or more processing units, but one of the processing units has the exclusive right to make changes to it. When that processing makes changes, it notifies the other processing units-since the notified processing units may need to invalidate or update based on the CCP implementation.

The storage media 104 can store computer-executable instructions and/or data structures representing executable software components, such as a tracer 110, a debugger 111, an emulator 112, and at least one application 113; correspondingly, during execution of this software at processor 102, one or more portions of these computer-executable instructions and/or data structures can be loaded into system memory 103 (i.e., shown as tracer 110', debugger 111', emulator 112', and application 113'). In addition, the storage media 104 might store additional data, such as at least one execution trace 114 (e.g., a trace representing execution of application 113 at processor 102).

If present, the tracer 110 can record or "trace" execution of at least one application 113 (which can include user mode code and/or kernel mode code) into at least one trace 114. Thus, FIG. 1A also shows that the tracer 110 may be loaded into system memory 103 (i.e., tracer 110'). An arrow between tracer 110' and trace 114' indicates that the tracer 110' can record trace data into a trace 114' (which, as shown, might be persisted to the storage media 104 as trace 114). In embodiments, the tracer 110 can record execution of an application 113 when that execution is on the processor 102 directly, and/or when that execution is the processor 102 indirectly (e.g., via a managed runtime, virtual machine, emulator, etc.).

Figure 3:
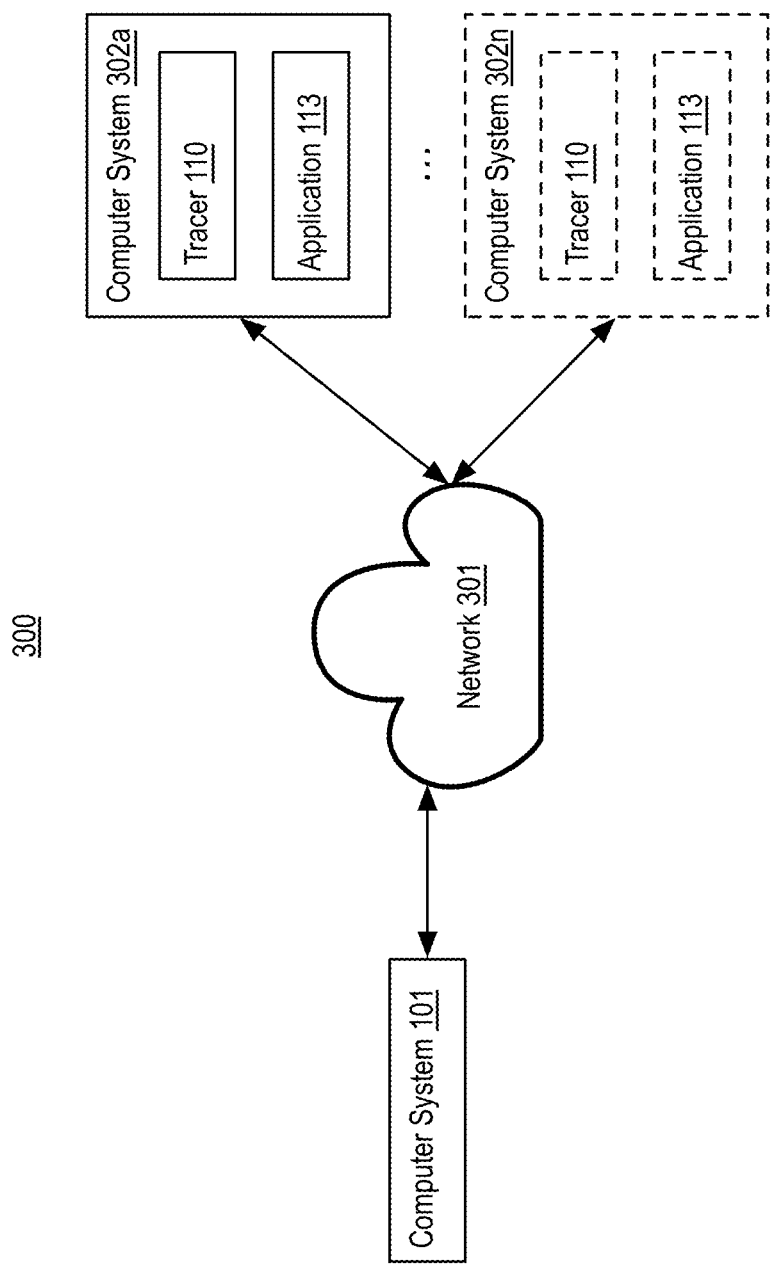
FIG. 3 illustrates an example computing environment in which the computer system of FIG. 1A is connected to one or more other computer systems over at least one network.

Computer system 101 might additionally, or alternatively, receive a trace 114 from another computer system (e.g., using communications channel 105). For example, FIG. 3 illustrates an example computing environment 300 in which computer system 101 of FIG. 1A is connected to one or more other computer systems 302 (i.e., computer systems 302*a*-302*n*) over at least one network 301. As shown in example 300, each computer system 302 includes the tracer 110 and the application 113 of FIG. 1A. As such, computer system 101 may receive, over the network 301, at least one trace 114 of one or more prior executions of application 113 at one or more of these computer systems 302.

In some embodiments, the tracer 110 records a "bit-accurate" trace of execution of one or more threads of application 113. As used herein, a bit accurate trace is a trace that includes sufficient data to enable code that was previously executed at one or more processing units 107 to be "replayed" in an emulator (e.g., emulator 112), such that it executes during emulation in substantially the same manner at replay time as it did during tracing. There are a variety of approaches the tracer 110 might use to record bit-accurate traces. Some a brief overview of some approaches is now briefly summarized, though it will be appreciated that the embodiments herein can operate in connection with traces 114 recorded using other approaches. Additionally, optimizations could be applied to any of these approaches that, for brevity, are not described herein.

In embodiments, the tracing approaches used by the tracer 110 are built upon the recognition that processor instructions (e.g., machine code instructions executed by processing unit 107) generally fall into one of three categories: (1) instructions identified as "non-deterministic" as not producing predictable outputs because their outputs are not fully determined by data in general registers (e.g., registers 107a) or a cache (e.g., cache 108), (2) deterministic instructions whose inputs do not depend on memory values (e.g., they depend only on processor register values, or values defined in the code itself), and (3) deterministic instructions whose inputs depend on reading values from memory (e.g., cache 108). Thus, in some embodiments, storing enough state data to faithfully reproduce the prior execution of instructions can be accomplished by addressing: (1) how to record non-deterministic instructions that produce output not fully determined by their inputs, (2) how to reproduce the values of input registers for instructions depending on registers, and (3) how to reproduce the values of input memory for instructions depending on memory reads.

To address the challenge of reproducing execution of non-deterministic instructions that produce output not fully determined by their inputs, embodiments might record into a trace 114 the side-effects of execution of such instructions (e.g., those instructions' outputs). As used herein, "non-deterministic" instructions can include somewhat less common instructions that (i) produce non-deterministic output each time they are executed (e.g., RDTSC on INTEL processors, which writes the number of processor cycles since the last processor reset into a register), that (ii) may produce a deterministic output, but depend on inputs not tracked during trace recording (e.g. debug registers, timers, etc.), and/or that (iii) produce processor-specific information (e.g., CPUID on INTEL processors, which writes processor-specific data into registers). Storing the side-effects of execution of such instructions may include, for example, storing register values and/or memory values that were changed by execution of the instruction. In some architectures, such as from INTEL, processor features such as those found in Virtual Machine eXtensions (VMX) could be used to trap instructions for recording their side effects into a trace 114.

Addressing the challenge of how to reproduce the values of input registers for deterministic instructions (e.g., whose inputs depend only on processor register values) is straightforward, as they are the outputs of the execution of one or more prior instructions. Thus, a trace 114 can represent the execution of an entire series of processor instructions by storing data that can be used to reproduce the register values at the beginning of the series.

To address how to reproduce the values of input memory for deterministic instructions whose inputs depend on memory values, embodiments might record into a trace 114 the memory values that these instructions consumed (i.e., the reads)—irrespective of how the values that the instructions read were written to memory. In other words, a trace 114 might represent the values of memory reads, but not necessarily the memory writes (though a trace 114 is not precluded from including memory writes). For example, although values may be written to memory by a current thread, by another thread (including the kernel, e.g., as part of processing an interrupt), or by a hardware device, it is just the values that the thread's instructions read that are needed for full replay of instructions of the thread that performed the reads. This is because it is those values that were read by the thread (and not necessarily all the values that were written to memory) that dictated how the thread executed.

While a trace 114 can be recorded fully in software (e.g., based on emulation), it might also be recorded, at least in part, with assistance by the processor 102. One hardware-based approach to recording these reads is built on the recognition that a processor (e.g., processor 102) forms a semi- or quasi-closed system. For example, once portions of data for a thread (i.e., code data and runtime application data) are loaded into the cache 108, the processor 102 can run by itself—without any input—as a semi- or quasi-closed system for bursts of time. In particular, once the cache 108 is loaded with data, one or more of processing units 107 can execute instructions from a code portion of the cache 108, using runtime data stored in a data portion of the cache 108 and using the registers 107a. When a processing unit 107 needs some influx of information (e.g., because an instruction it is executing, will execute, or may execute accesses code or runtime data not already in the cache 108), a "cache miss" occurs and that information is brought into the cache 108 from system memory 103. The processing unit 107 can then continue execution using the new information in the cache 108 until new information is again brought into the cache 108 (e.g., due to another cache miss or an un-cached read). Thus, embodiments might record into a trace 114 sufficient data to be able to reproduce the influx of information into the cache 108 as a traced code executes. In addition, embodiments might also record into the trace 114 sufficient data to be able to reproduce any un-cached or uncacheable reads. In embodiments, when multi-layer caches are used, hardware-based tracing approaches might record influxes at a particular "logged" cache layer. Thus, for example, in the example environment 200 of FIG. 2, if logging is being performed on an L2 layer, a logged influx might be served by an L3 layer and/or system memory 202.

There can be additional optimizations to cache-based tracing. For example, one optimization to cache-based logging is to track and record only the cache lines that were consumed by each processing unit 107, rather than simply recording the cache influxes. As will be appreciated by one of ordinary skill in the art, this can result in significantly smaller trace files than simply recording the cache influxes. As used herein, a processing unit 107 has "consumed" a cache line when the processing unit 107 is aware of its present value. This could be because the processing unit 107 is the one that wrote the present value of the cache line, or because the processing unit performed a read on the cache line (which may cause an influx to the cache line if it was not already current with system memory 103).

In some implementations, tracking consumed cache lines might involve extensions to the cache 108 that enable the processor 102 to identify, for each cache line, one or more processing units 107 that consumed the present value of the cache line. For example, the cache 108 might associate one or more one or more tracking bits with each cache line. Depending on the number of tracking bits, and on implementation of logic using those tracking bits, these tracking bits could be used, for example, to indicate whether or not any processing unit 107 has consumed the corresponding cache line (e.g., a single flag bit), which specific one or more processing units have consumed the corresponding cache line (e.g., a tracking bit per processing unit 107), an index to a single processing unit that has consumed the corresponding cache line (e.g., by using a plurality of tracking bits to store an integer index), and the like. In additional, or alternative, implementations, tracking consumed cache lines might involve relying on the CCP messages used by the cache 108 to determine a subset of "consumed" cache lines to record into a trace 114. For example, a CCP-based logging approach might store into the trace 114 the influxes of data to a given logged cache level (e.g., an L2 cache), along with a log of at least a portion of the CCP operations that can be used to determine which processing unit caused a given influx.

Whether using tracking bits and/or CCP messages to track consumed cache lines, these approaches might operate at one or more cache levels. For example, one multi-level logging approach (i.e., using two or more cache levels) that uses CCP messages might store into the trace 114 at least a portion of the influxes of data to one cache level (e.g., an L2 cache), along with a log of at least a portion of the CCP messages at least one other cache level (e.g., an L1 cache). These CCP message could include, for example, a subset of CCP state transitions for each cached memory location (i.e., between sections of "load" operations and sections of "store" operations). Other multi-level logging approaches might track influxes to one cache level (e.g., an L1 cache) and then leverage knowledge a one or more backing caches (e.g., an L2 cache) to determine if, and how, to log the influx. In one example variant, after detecting an influx to a first cache (e.g., an L1 cache), embodiments determine if a backing second cache (e.g., an L2 cache) has knowledge (e.g., using accounting bits, CCP data, etc.) that could prevent the influx from being logged, or that could enable the influx to be logged by reference to a prior log entry. Then, this variant might log the influx at the first cache either by value or by reference. Another example variant could detect an influx at a first cache (e.g., an L1 cache), and then send a logging request to a backing second cache (e.g., an L2 cache). After receiving the logging request, the second cache could use its knowledge (e.g., accounting bits, CCP data, etc.) to determine if and how the influx should be logged (e.g., by value or by reference, by the second cache or by the first cache, etc.), and/or to pass the request to another backing cache (e.g., an L3 cache) to repeat the process.

Figure 4:
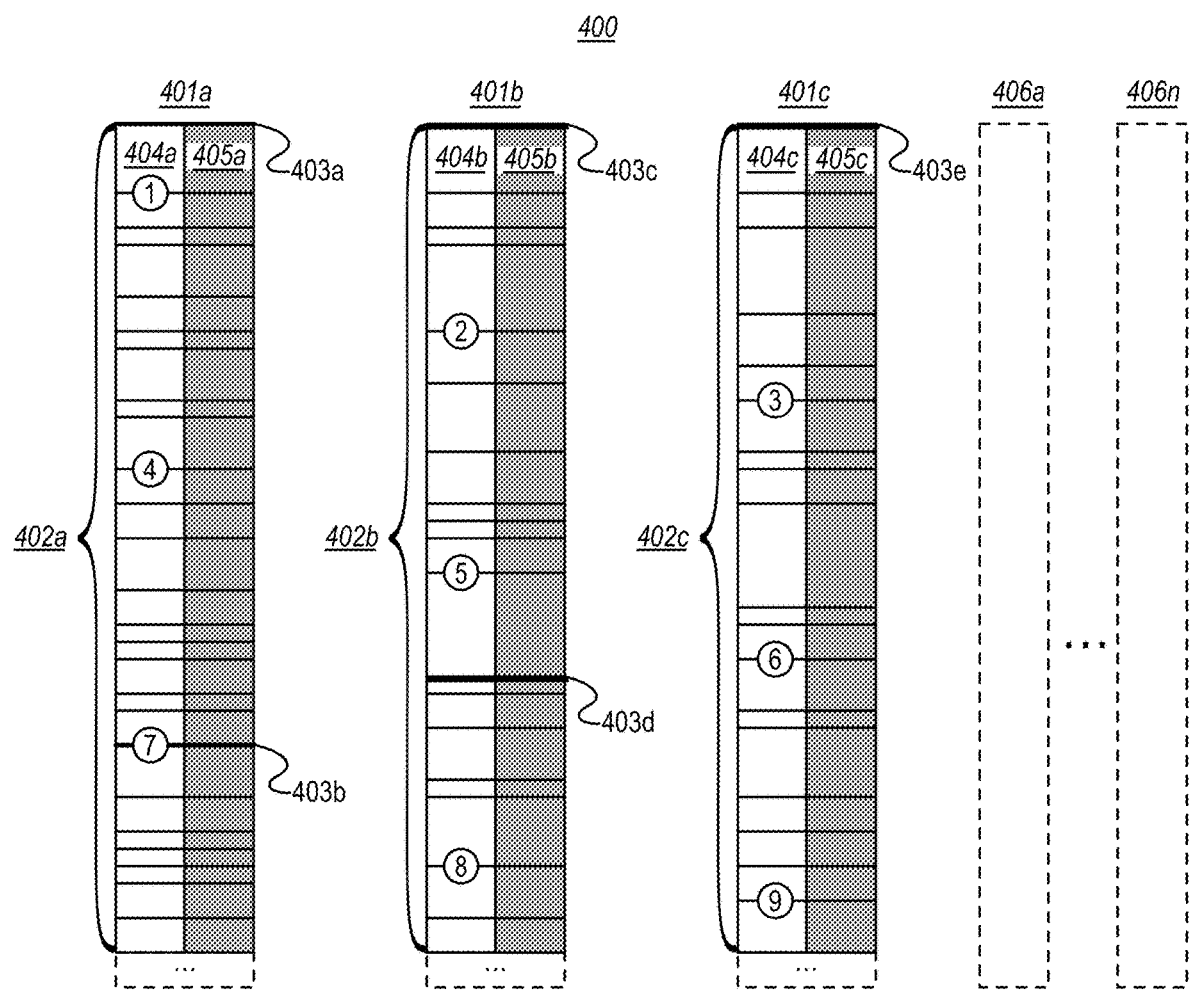
FIG. 4 illustrates one example of a time-travel debugging trace.

FIG. 4 illustrates one example of a trace 400, which might correspond to trace 114 of FIG. 1A, and which could be created in accordance with one or more of the foregoing tracing techniques. In the example of FIG. 4, trace 400 includes one or more trace data streams 401. In FIG. 4, three trace data streams 401 are illustrated (i.e., trace data streams 401a-401c). In embodiments, each trace data stream 401 represents execution of a different thread that executed from the code of an application 113. For example, trace data stream 401a might represent execution of a first thread of an application 113, trace data stream 401b might represent execution of a second thread of the application 113, and trace data stream 401c might represent execution of a third thread of the application 113. As shown, each trace data stream 401 comprises a plurality of data packets 402 (i.e., data packets 402a for trace data steam 401a, data packets 402b for trace data stream 401b, and data packets 402c for trace data stream 401c). In other embodiments, each trace data stream 401 might only represent a subset of execution of a thread, such that multiple trace data streams 401 are needed to full represent execution of the thread. In yet other embodiments, a trace data stream 401 might represent execution of a plurality of threads (e.g., plural threads that executed at a single processing unit 107). Since the particular data logged in each data packet 402 might vary, the data packets 402 are shown as having varying sizes. As will be appreciated in view of the forgoing discussions of trace techniques, a data packet 402 might represent at least the inputs (e.g., register values, memory values, cache line data, etc.) to one or more executable instructions that executed as part of this first thread of the application 113.

As shown by heavy horizontal lines, the trace data streams 401 might also include one or more key frames 403 (e.g., key frames 403a-403e) that each represents sufficient information, such as a snapshot of register and/or memory values, that enables the prior execution of the thread containing the key frame to be replayed, starting at the point of the key frame 403 forwards. In addition, each trace data stream 401 might include one or more sequencing events, shown in FIG. 4 as circles numbered 1-9. While, in embodiments, each trace data stream 401 generally represents execution of a corresponding single thread, sequencing events represent the occurrence of events that are orderable across the threads (and, thus, that are orderable across the trace data streams 401). These sequencing events may correspond, for example, to events in which threads interact, such as through shared memory, via function calls, etc. While, for simplicity, the order of events in trace data streams 401 rotate through the threads a round-robin manner, it will be appreciated that they would typically appear in a less predictable manner.

In embodiments, a trace 114 might also include the actual code that was executed. Thus, in FIG. 4, each data packet 402 is shown as including a non-shaded execution trace portion 404 (i.e., execution trace portion 404a for data packets 402a, execution trace portion 404b for data packets 402b, and execution trace portion 404c for data packets 402c) and a shaded code portion 405 (i.e., code portion 405a for data packets 402a, code portion 405b for data packets 402b, and code portion 405c for data packets 402c). In embodiments, the code portion 405 in the packets 402 might include the executable instructions that executed based on the corresponding execution trace data. In other embodiments, however, a trace 114 might omit the actual code that was executed, instead relying on having separate access to the code of the application 113. In these other embodiments, each data packet may, for example, specify an address or offset to one or more appropriate executable instructions. As shown, a trace 114 might include any number of additional data streams 406 (i.e., data streams 406a-406n), which can store any type of additional trace data. This additional trace data may include, for example, indexing data such as occasional memory snapshots, reverse-lookup data structures for quickly locating memory addresses/values in the trace data streams 401, etc. Thus, when using the term "trace" herein, the term can refer not only actual trace data (i.e., trace data streams 401), but also to indexing data.

In some implementations, the tracer 110 might continually append to trace data streams 401, such that trace data continually grows during tracing. In other implementations, however, the trace data streams 401 could be implemented as one or more ring buffers. In such implementations, the oldest trace data is removed from a trace data stream 401 as new trace data is added. As such, when the trace data streams 401 are implemented as one or more ring buffers, they contain a rolling trace of the most recent execution at the traced threads. Use of ring buffers may enable the tracer 110 to engage in "always on" tracing, even in production systems. In some implementations, tracing can be enabled and disabled at practically any time. As such, whether tracing to a ring buffer or appending to a traditional trace data stream, the trace data could include gaps between periods during which tracing is enabled.

Retuning to FIG. 1A, the debugger 111 can perform various debugging tasks, including processing queries against the lifetimes of memory-backed objects, based on at least on an execution trace 114. In embodiments, the debugger 111 processes such queries based on identifying/defining "handles" to memory-backed objects that existed in one or more prior executions of an application 113, as found in at least one trace 114. As used herein, a handle is a logical reference to memory that was "covered" by a memory-backed object to which the handle corresponds during the lifetime of the memory-backed object. Thus, as part of receiving and/or processing a query against a trace 114, the debugger 111 might identify a memory-backed object that existed in a traced execution of application 113, might identify/define a handle to the memory-backed object, and/or might identify memory addresses that were covered by the memory-backed object over its lifetime (as found in the trace 114). Since the trace 114 can be used to obtain information about memory coverage by a memory-backed object over a period of execution time, the debugger 111 can processes memory-related queries that rely on the concept of execution time. These concepts are discussed in greater detail below.

In embodiments the debugger 111 process such queries using one or both of a static analysis or a dynamic analysis of a trace 114. As used herein, a static analysis of a trace 114 comprises the debugger 111 performing the analysis based on data read from the trace 114 only (e.g., based on trace data in the trace data streams 401, based on index data in additional data streams 406, etc.). A dynamic analysis of a trace 114, on the other hand, can use data that is generated/obtained from a replay/emulation of code of application 113 based on the trace 114. Thus, FIG. 1A shows that the emulator 112 may also be loaded into system memory 103 (i.e., emulator 112'), and that the application 113 may be emulated by the emulator 112' using a trace 114 (i.e., application 113' within emulator 113'). An arrow connecting the debugger 111', the emulator 112', and the trace 114' indicates that the debugger 111' can request emulation of a trace 114' by the emulator 112', and that the emulator 112' can provide results of that trace emulation to the debugger 111'.

It is noted that, while the tracer 110, the debugger 111, and/or the emulator 112 might each be independent components or applications, they might alternatively be integrated into the same application (such as a debugging suite), or might be integrated into another software component—such as an operating system component, a hypervisor, a cloud fabric, etc. As such, those skilled in the art will also appreciate that the invention may be practiced in a cloud computing environment of which computer system 101 is a part. For instance, a cloud computing environment might be used to parallelize trace processing (e.g., trace replay, trace querying etc.) on behalf of computer system 101, the cloud computing environment might provide a trace processing service, etc.

Figure 1B:
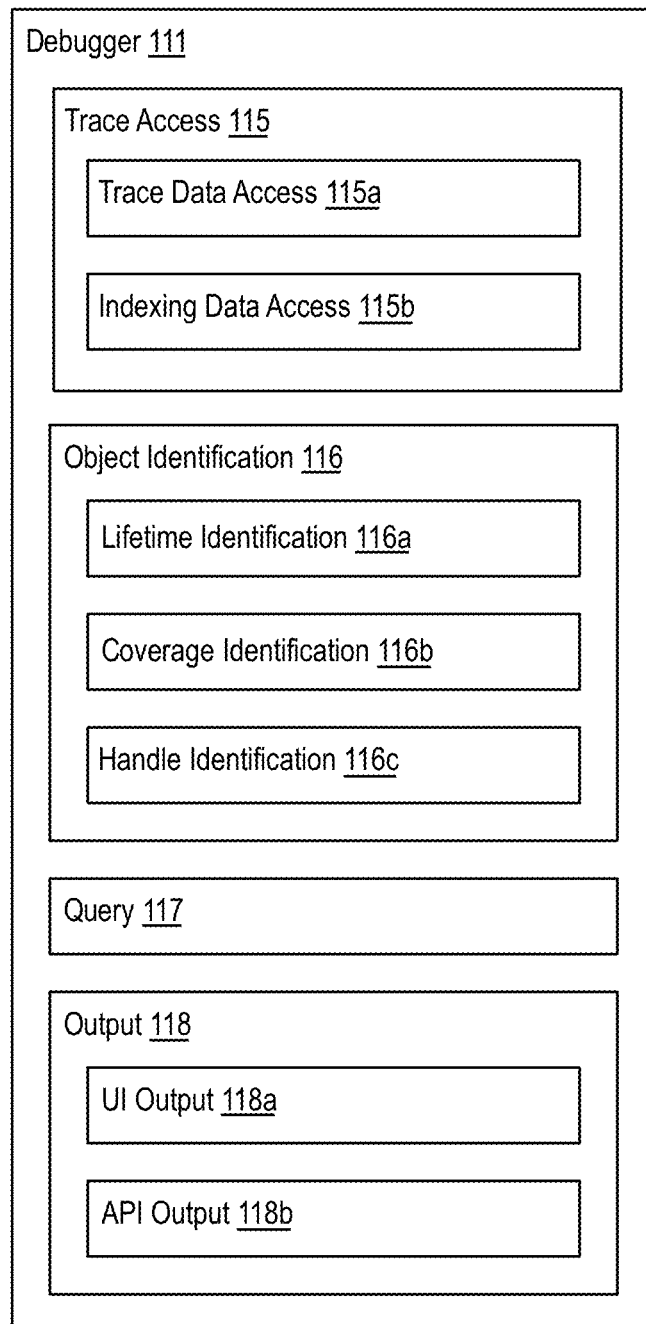
FIG. 1B illustrates is an example that provides detail of possible components of a debugger.

Turning now to FIG. 1B, illustrated is an example 100b that provides additional detail of possible components of the debugger 111 of FIG. 1A, and particularly those components that may relate directly to providing functionality to process queries against the lifetimes of memory-backed objects, based on at least on a trace 114. For example, the depicted debugger 111 in FIG. 1B includes a trace access component 115, an object identification component 116, a query component 117, and an output component 118. Each of these components represent various functionalities that the debugger 111 might implement in accordance with various embodiments described herein. It will be appreciated, however, that the depicted components—including their identity, sub-components, and arrangement—are presented merely as an aid in describing various embodiments of the debugger 111, and that these components/sub-components are non-limiting to how software and/or hardware might implement various embodiments of the debugger 111, or of the particular functionality thereof.

In general, the trace access component 115 accesses at least one trace 114. For example, the trace access component 115 might access a trace 114 as part of initiating a debugging session against a prior execution of application 113, as part of receiving a user-specified query (e.g. at a debugger user interface) in connection with a debugging session, as part of an Application Programming Interface (API) request by some other application, etc. The trace access component 115 can access a variety of trace data types. For example, a trace data access component 115a might access trace data itself (e.g., trace data streams 401), while an indexing data access component 115b might accessed indexing data or other supporting data (e.g., additional data streams 406).

The object identification component 116 identifies at least one memory-backed object from the accessed trace 114. As used herein, a "memory-backed object" is any runtime data structure that uses one or more memory cells (e.g., in the cache 108, in system memory 103, etc.) for data storage. For example, a memory-backed object might comprise a programming language primitive type (e.g., integer, Boolean, char, float, etc.), a data structure (e.g., array, struct, vector, linked list, etc.), an object created from a class, a heap, a virtual address space, etc. A memory-backed object might be stored in a variety of memory locations, such those corresponding to a process' stack and/or the process' heap. The object identification component 116 can identify a memory-backed object in a variety of ways, such as based on a specified memory address (e.g., any memory address covered by that memory-backed object), based on a specified name or reference (e.g., if debugging symbols are available to the debugger 111), based on a specified pointer, etc.

As shown, the object identification component 116 can include additional components for identifying and/or defining additional information associated with a memory-backed object. For example, a lifetime identification component 116a can identify a lifetime of a memory-backed object. In embodiments, this includes pairing a first event defining a beginning of the lifetime of the memory-backed object with a second event defining an ending of the lifetime of the memory-backed object.

In embodiments, the lifetime identification component 116a pairs express lifetime defining events. For example, the lifetime of a memory-backed object might be explicitly defined by calls to allocation/deallocation primitives. For instance, a call to malloc( ) or calloc( ) might define the beginning of an object's lifetime, while a call to free( ) might define the end of the object's lifetime; a call to HeapAlloc( ) might define the beginning of a heap's lifetime, while a call to HeapFree( ) might define the end of the heap's lifetime; a call to VirtualAlloc( ) might define the beginning of a virtual address space lifetime, while a call to VirtualFree( ) might define the end of the virtual address space's lifetime; etc. The lifetime identification component 116a might also track intermediary allocation/deallocation primitives, such as calls to realloc( ).

In embodiments, the lifetime identification component 116a determines if allocation and deallocation primitives are compatible. For example, an allocation primitive may be compatible with a de-allocation primitive they are in the same allocation family (e.g., malloc( ) and free( ), plus a desired set of parameters match. So, for example, a call to HeapAlloc( ) might be compatible with a call to HeapFree( ) if they use the same heap; but these calls might be incompatible if they use different heaps.

Additionally, or alternatively, the lifetime identification component 116a might pair implicit lifetime defining events. For example, when entering a function, a stack frame generally is "pushed" onto the thread's stack. If there are any local variables in this function, this stack frame includes memory locations on the stack for these variables. This is an implicit allocation of memory to store these variables. Later, when the function completes, the stack frame generally is "popped" from the thread's stack. This is an implicit deallocation the memory storing these variables. Another example of an implicit allocation is a reclassification of memory, such as a "placement new( )" in C++, which constructs a new object from already allocated memory.

At times, whether a memory-backed object's lifetime was created explicitly or implicitly, its lifetime might end due to the destruction of a containing structure. Thus, the lifetime identification component 116a might identify an ending of a lifetime based on the destruction of a containing structure. For example, the lifetime of a memory-backed object might be terminated by destruction of a parent object (e.g., in the case of multiple-inheritance), by deallocation of a heap or a stack, by a call to VirtualFree( ) (or similar), or due to a thread/process termination. Additionally, a memory-backed object's lifetime might end—at least for purposes of trace analysis—due a termination of tracing (i.e., because there is no more traced information about the object's lifetime).

In embodiments, the lifetime identification component 116a might be aware of managed runtime environments, such as JAVA, the .NET Common Language Runtime (CLR), etc. Thus, the lifetime identification component 116a might identify lifetime events based on operation of managed runtime components, such as an allocator, a garage collector, etc.

Based at least on the lifetime of given memory-backed object (i.e., as determined by the lifetime identification component 116a), a coverage identification component 116b determines what memory was covered by the memory-backed object, and at what time or times that memory was covered by the memory-backed object. For example, if the memory-backed object is an array, the coverage identification component 116b might identify all memory addresses that were part of the array, along with the execution time(s) at which those memory addresses were part of the array; if the memory-backed object is a struct, the coverage identification component 116b might identify all memory addresses that were part of the struct, along with the execution time(s) at which those memory addresses were part of the struct; if the memory-backed object is an object (e.g., an instance of a class), the coverage identification component 116b might identify all memory addresses that were part of the object, along with the execution time(s) at which those memory addresses were part of the object; etc.

As will be appreciated, the memory locations that are associated with a memory-backed object might change over the lifetime of the object. For example, a call to realloc( ) might expand or contract the heap memory allocated to an object, and/or might move the object in memory entirely. As another example, many data types (e.g., vectors, linked lists, etc.) can grow and/or shrink over time, thus dynamically changing the memory locations that are allocated to those data types over time. As yet another example, at any time a garbage collector might dynamically reduce the memory allocated to an object and/or move the object in memory entirely. Additionally, even memory addresses that are allocated to an object at one time might become invalid for the object at another time (e.g., due to a context switch, such as kernel mode to user-mode, or between user-mode threads).

In view of the foregoing, in implementations, a memory address might be considered to be "covered" by a memory-backed object if it was ever part of the memory-backed object. However, just because a memory address was "covered" by the memory-backed object, that does not mean that is was a valid memory address for the memory backed object during the entire lifetime of the memory-backed object. Thus, while a given memory address might be covered by a memory-backed object, it might be valid for the memory-backed object at one execution time, while it is invalid at another execution time.

Figure 5A:
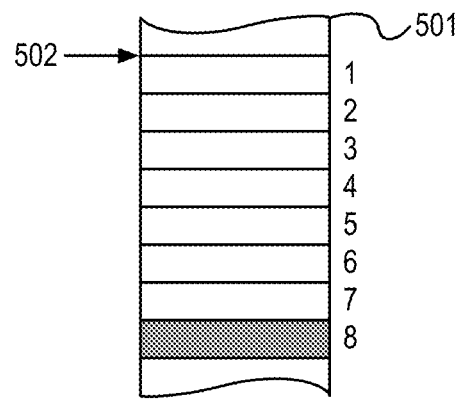
FIG. 5A illustrates an example of a memory allocation that includes memory padding.

In embodiments, the coverage identification component 116b can use specific knowledge of allocation primitives, data structure types, etc. to granularly track what memory is actually allocated by a memory-backed object. For example, the coverage identification component 116b might use knowledge of an allocation primitive to determine what heap memory is actually allocated to an object, and what heap memory might be reserved by the allocation primitive for other purposes, such as padding. For instance, FIG. 5A illustrates an example 500a that includes a memory allocation 501 that could result from a thread's request for a block of seven bytes of heap memory (e.g., a call to "malloc(7)"). In particular, memory allocation 501 shows memory range including seven bytes starting at memory address 502. As such, a call to the allocation function might return memory address 502 to the thread, and the thread can then use integer offsets from this address to access the allocated memory (bytes 1-7). In addition to this allocation of seven bytes, FIG. 5A also shows that the memory allocation 501 could also include an eighth "padding" byte (indicated by shading). The allocation function may have reserved this padding byte to facilitate memory alignment (e.g., 8- or 16-byte memory alignment) in order to speed memory accesses based on characteristics of the physical memory and/or memory bus. This padding byte is technically not allocated to the thread that requested the seven-byte allocation. In embodiments, the coverage identification component 116b is aware of this padding and can treat it as not being covered by the corresponding memory-backed object.

Figure 5B:
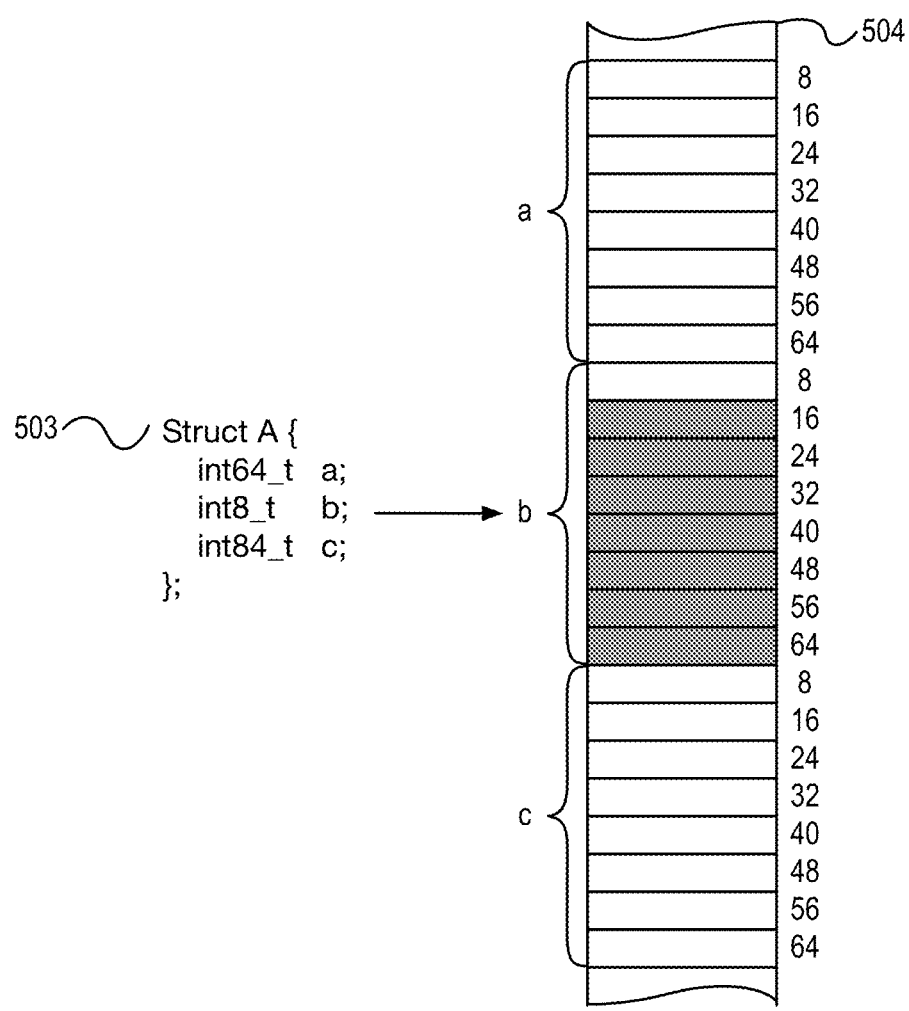
FIG. 5B illustrates an example of a memory allocation that includes a gap.

In another example, the coverage identification component 116b might use type information associated with a data structure to granularly track individual memory allocations for the data structure. For example, FIG. 5B includes an example 500b that shows a struct primitive 503 that includes three 64-bit integers (i.e., a, b, and d) and one 8-bit integer (i.e., c). FIG. 5B also illustrates an example memory allocation 504 that might be allocated on a thread's stack based on struct primitive 503. In particular, FIG. 5B shows that a contemporary compiler might reserve 64-bit memory ranges for each of integers a, b, c, and d. As shown, however, the 64-bit memory range for integer c includes 8-bits for the integer itself, followed by a 56-bit gap (indicated by shading). Similar to the padding discussed in FIG. 5A, this gap might be created by the compiler in order to align the variables on 64-bit boundaries, but it is not actually allocated for use by the struct primitive. In embodiments, the coverage identification component 116b is aware of this gap and can treat it as not being covered by the struct.

In embodiments, the coverage identification component 116b identifies for the memory-backed object a set of logical associations, each associating at least two pieces of information: (i) at least one memory address, and (ii) at least one execution time at which the memory address (or addresses) was considered "covered" by the memory-backed object during its lifetime. These logical associations could be implemented in a variety of manners, such as by tuples (e.g., data structures, each directly specifying one or more memory addresses and one or more execution times). In embodiments, a plurality of memory addresses could be specified by range (e.g., a start address and a byte count, a start address and an end address, and the like), a list of individual memory addresses, or combinations thereof. Similarly, a plurality of execution times could be specified by a range, a list, or combinations thereof.

A handle identification component 116c identifies or defines a handle to a memory-backed object. As mentioned, a handle is a logical reference to memory that was covered by a memory-backed object the memory-backed object's lifetime. Thus, for instance, a handle can serve as a logical abstraction that represents the set of logical associations (e.g., tuples) that were identified by the coverage identification component 116b. A handle can be virtually anything that can be used to identify an object, such as a pointer (e.g., to a memory address covered by the memory-backed object), a debugger symbol, a source-code level object name, etc. In implementations, when any memory address is considered "covered" by a handle is also considered "valid for" the handle at the time that is was considered covered. However, it is also possible that a handle could refer to coverage and validity separately.

In embodiments, a handle might refer to other information relevant to the memory-backed object as well. For example, this information could include things like (i) a beginning execution time (i.e., when the object's lifetime began); (ii) an end execution time (i.e., when the object's lifetime ended); (iii) a memory accessibility indicator, such as "kernel-mode only", "user mode context A", "R--", "R-X", "RWX", "-W-", "--X", paged-out, etc.; (iv) a cached list of memory accesses associated with the handle; (v) an indication that a first memory address covered by the handle is "moving" to a second memory address (e.g., due to a realloc( )), and an indication of one or more corresponding execution times for that move; and the like. If this additional information includes a cached list of memory accesses associated with the handle, it could include "states" for one or more of these accesses, such as (a) an access was a covered memory access for the handle, (b) an access was a covered memory access for the handle, but the accessed memory was marked as inaccessible, (c) an access was associated with the handle, but to an uncovered address, (d) an access was associated with the handle, but before its lifetime beginning, (e) an access was associated with the handle, but after its lifetime ending, (f) an access was associated with the handle, but when the memory was paged-out, (g) an access was to uninitialized memory (e.g., read after lifetime beginning, but before a write), (h) cached results of prior queries against this trace 114, or common queries of other traces, etc. If this additional information includes an indication that a first memory address covered by the handle is "moving" to a second memory address, it could include additional details such as, (a) write to an old memory location after the object was copied to the new location; (b) a read from a new memory location after it was allocated, but prior the object being copied from old location (even if the allocation initialized the memory); etc.

Since a handle is a logical reference to memory that was covered by a memory-backed object the memory-backed object's lifetime, it can refer to that object (including the logical associations identified by the coverage identification component 116b) even if that nature and/or location of that object changes over time. For example, if the base memory location of an object moves (e.g., due to a garbage collection cycle, due to a call to realloc( ) etc.), a handle might refer to the object regardless of where that object resides in memory at a given point in time; if the object has a different mapping based on context (e.g., a physical address access via DMA; a user-mode address that gets locked by kernel-mode code at multiple different times, and those locked kernel-mode addresses differ; etc.), a handle might refer to the object regardless of context; if the size of an object changes over time (e.g., in the case of a linked list, a vector, etc.), a handle might refer to any and all of the memory that was allocated to the object over time—for instance, if the memory-backed object is the head of a linked list, a handle might refer to any of the elements that are part of that linked list at any particular point in time.

In addition, since a handle is a logical reference to memory that was covered by a memory-backed object the memory-backed object's lifetime, it can be used to identify accesses to that object regardless of how that object was accessed during tracing. For example, an object might typically be accessed based on an offset from a base memory address (e.g., the base address of a heap allocation as returned by malloc( ) an address corresponding to the first element in an array or vector, an address corresponding to the base class of an object, etc.) However, a handle can refer to accesses to an object based on any address that is covered by the object. For instance, a handle might embody accesses to an object from a positive or negative offset from a memory location within the object (i.e., not a base address). This situation can arise, for example, in multiple inheritance situations. For example, an object might be defined using a base class (which could typically correspond to a first base address for the object in memory) as well as a derived class (which would typically be laid out after the base class in memory, and thus begin at a later second address). In this situation, the object might be accessed based on its derived class—and thus the second address. However, even though this access is from the second address (and not the base address), a handle might logically include this access from the second address since it is part of the overall object (i.e., including memory associated with the base class).

Following is an additional example of the concept of using a handle to identify accesses to an object allocated to the heap using malloc( ) regardless of how that object was accessed during tracing. This example is built on the recognition that any access to the object's covered memory region that is valid must have got a pointer (address) for that access that can be eventually tracked back to the pointer originally returned by malloc( ) and for it the be valid the access must happen before the object was deallocated (e.g., by a call to free( )). Any access tracked back to that pointer that takes place after the deallocation is invalid, that happens out of bounds in invalid, and any access to that region through something that doesn't track back to that pointer is also invalid. So, for example, suppose there are two structs, Foo and Bar. Foo has two "int" members, A1 & A2, while Bar has one "int" member, B1. In the following examples, it is assumed, for illustrative purposes, that A2 is allocated after A1 in memory, and that and both are of the size of an int and the alignment of an int, and that B1 is allocated after A2 in memory, and that is the size of an int and the alignment of an int. Given a statement allocating Foo,

```
pointerToFoo=(Foo*)malloc(sizeof(Foo));
```

A logical "handle" for object Foo can now have a starting lifetime for Foo, the size of Foo, and the memory location of the allocation. Given a statement allocating Bar,

```
pointerToBar=(Bar*)malloc(sizeof(Bar));
```

A logical "handle" for object Bar can now have a starting lifetime for Bar, the size of Bar, and the memory location of the allocation. Given these two statements, Bar might be allocated after Foo in memory.

The logical handles to Foo and Bar can be used to track various access to these structs, regardless of the actual "pointers" that were actually is in code. For example, the statement:

pointerToFoo_A1=&(pointerToFoo→A1);

is another way to access Foo, via its member A1. Using Foo's logical handle, this access can be tracked back to the original malloc( ) for Foo. Similarly, the statement:

anotherPointerToFoo=pointerToFoo;

is another way to access Foo. Using Foo's logical handle, this access can also be tracked back to the original malloc( ) for Foo. In addition, the statement:

pointerToFoo_A2=&(pointerToFoo→A2);

This is yet another way to access Foo. Using Foo's logical handle, this access can also be tracked back to the original malloc( ) for Foo. Note that pointerToFoo_A1 and pointerToFoo_A2 cannot have the same memory address (i.e., members A1 and A2 are not at the same address in memory), but both of them are trackable back to Foo, and hence are a valid way to access memory in Foo's allocation, as long as it is done before a deallocation of Foo.

Extending the example, in the statement:

int*pint=(int*)pointerToFoo;

the memory access is again trackable to Foo, so any access through the pointer pint has legal access to Foo's region of memory while that region is valid. This means that the statements:
    *pint=1;
    pInt[0]=2;
    pInt[1]=3;
are all valid writes to Foo's memory region (i.e., writing the value 1 to A1, then the value 2 to A1, then the value 3 to A2). However, the statement:

pint[2]=4;

would be an invalid write to Bar's memory region via a pointer to Foo (and thus an invalid memory access to the logical handle for Foo). This is because the access is done to a region of memory (i.e., corresponding to Bar) via an access that cannot be tracked back to the handle's allocation.

It is noted that the lifetime identification component 116a, the coverage identification component 116b, and the handle identification component 116c might each operate independently, or operate together, in any order (including in parallel). For example, the object identification component 116 might operate based on the identity of a particular memory-backed object (e.g., by name, by symbol reference, etc.) to then identify one or more of its lifetime, its memory coverage, or its handle. As another example, the object identification component 116 might operate based on a given memory address (including execution time) to then identify a corresponding memory-backed object, including one or more of its lifetime, its memory coverage, or its handle. In yet another example, the object identification component 116 might operate based on a given handle to then identify a corresponding memory-backed object, including one or more of its lifetime or its memory coverage.

In general, the query component 117, receives and processes queries involving memory-backed objects, based on the information (e.g., object lifetime, covered memory addresses/times, handle, etc.) identified by the object identification component 116. The query component 117 might be configured to receive and process queries in a variety of forms, such as queries where an input is a handle, queries where the results of the query includes a handle, and/or queries where a handle is an intermediate result. The query component 117 enable a rich array of queries involving the memory covered by memory-backed object. For example, when using a handle as an input, the query component 117 might enable queries that return all of the memory accesses to an object associated with the handle, queries that return all of the inputs to an object associated with the handle (e.g., based on writes into covered memory), queries that return all of the outputs to an object associated with the handle (e.g., based on reads to covered memory), queries that return all objects that contain an object associated with the handle, queries that return all objects that are contained within an object associated with the handle, queries that indicate if an object associated with the handle was ever moved in memory, queries that return when an object associated with the handle was accessed, queries that return when an object associated with the handle was modified, queries that return whether there was a memory access using an object's handle after the object's lifetime ended (e.g., a use after free( )), queries that return whether memory before an object associated with the handle was accessed using the handle (e.g., a buffer underrun), queries that return whether memory after an object associated with the handle was accessed using the handle (e.g., a buffer overrun), queries that return whether padding was accessed using an object's handle, queries that return whether a memory gap was accessed using an object's handle, queries that return whether there was a read from to unallocated memory in an object associated with the handle, etc. While an object handle might be provided directly as an input to any of these queries, the handle might alternatively be identified as an intermediary result. For example, a query might receive an input a memory address and time, an identity of a memory-backed object (e.g., by name/symbols) etc. The query component 117 can then use the object identification component 116 to identify a handle, and then proceed with further query processing using the handle.

The query component 117 can even return handles as query results. For example, query might request a result set including handle to all objects for which there was a traced memory access of a particular type (e.g., all objects for which there was an access to uninitialized memory, all objects for which there was a use after free( ) etc.).

As some specific examples of queries, memory corruption bugs might be found with queries such as Allocations.Where
        (h=>h.CorrectDeallocation==false)

or handles.where(h=>!(compatible(h.allocator,h.deallocator)))

might return handles to all objects that were not properly deallocated (i.e., where a pair of matching allocation/deallocation functions were not found). In the second query, a compatible( ) function might return true, for instance, when:

(allocator==malloc && deallocator==free)‖

(allocator==LocalAlloc &&
        deallocator==LocalFree)‖

(allocator==new[ ] && deallocator==delete[ ])‖

(allocator==new && deallocator==delete).

It is noted that these conditions are illustrative examples only, and that there could be a variety of implementations of the compatible( ) function.

As another example, to return handles for objects that were yet deallocate at the current execution time might take the form:

Allocations.Where
    ($h$=>$h$.AllocationTime<Time.CurrentExecutionTime
    &&
    $h$.DeallocationTime>Time.CurrentExecutionTime)

This query would find allocations that, at a given execution time (e.g., a current execution time, a time when a given function was called, etc.), have already been allocated, but not de-allocated, at the given execution time.

The output component 118 returns any results generated by the query component 117. For example, a user interface output component 118a might provide results within a user interface (e.g., of a debugger), or an API output component 118a might provide results to some other application that made an API call to the debugger 111 to perform a query.

Figure 6:
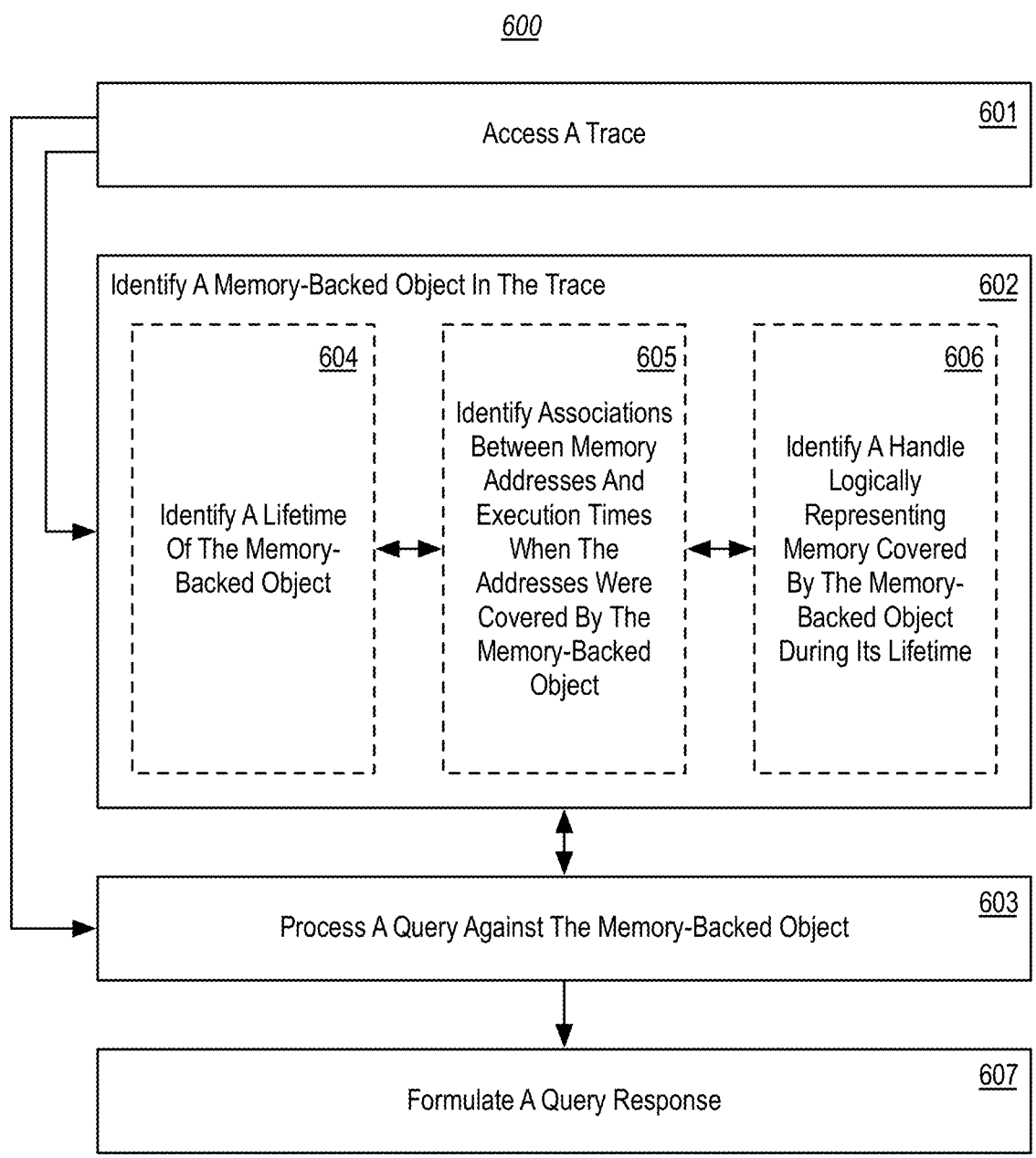
FIG. 6 illustrates a flowchart of an example method for processing a query against a lifetime of a memory-backed object based on an execution trace.

FIG. 6 illustrates a flow chart of an example method 600 for processing a query against a lifetime of a memory-backed object based on an execution trace. The discussion of method 600 refers method acts. Although these method acts may be discussed in a certain orders or may be illustrated in the flow chart as occurring in a particular order, no particular ordering is required unless specifically stated, or required because an act is dependent on another act being completed prior to the act being performed.

As shown in FIG. 6, method 600 includes an act 601 of accessing a trace. For example, the trace access component 115 can access trace 114 (e.g., trace 400). This trace access can include not only the trace data access component 115a accessing one or more trace data streams 401 representing a prior execution of application 113, but potentially also the indexing data access component 115b accessing one or more additional data streams 406 that contain indexing data. In embodiments, this indexing data might include any data previously identified by the object identification component 116 (e.g., based on prior queries, based on an indexing pass over trace 114, etc.).

Method 600 also includes act 602 of identifying a memory-backed object in the trace, and an act 603 of processing a query against the memory-backed object. As indicated by the arrows extending from act 601, there is no requirement that the memory-backed object be identified prior to processing a query against the memory-backed object, or that processing query result in identification of the memory-backed object. Thus, acts 602 and 603 might be performed in either order (e.g., depending on the particular terms of the query), and/or in parallel.

In embodiments, act 602 might comprise the object identification component 116 identifying a memory-backed object based on a direct specification of that memory-backed object (e.g., by name, by symbol, by pointer, etc.). As such, act 602 might comprise identifying, from a trace of a prior execution of an entity, a memory-backed object that existed during the prior execution of the entity based on this specification. For example, a debugger user interface might receive, a part of a query, a specification of a memory-backed object in source code at a particular point in time. Alternatively, a query might identify said object as an intermediary result and use that intermediary result for further query processing. Alternatively, act 602 might comprise identifying a memory-backed object based on an indirect specification of that memory-backed object. For example, a debugger user interface might receive, as part of a query, a selection of a particular memory access to a particular memory address. As such, act 602 might comprise the object identification component 116 identifying, from a trace of a prior execution of an entity, a memory address that was used as part of the prior execution of the entity during at least one execution time and identifying at least one memory-backed object to which the memory address was associated during the at least one execution time.

As shown, act 602 of identifying a memory-backed object in the trace can include, or at least rely on, one or more of an act 604 of identifying a lifetime of the memory-backed object, an act 605 of identifying associations between memory addresses and execution times when the addresses were covered by the memory-backed object, and an act 606 of identifying a handle logically representing memory covered by the memory-backed object during its lifetime. As shown in FIG. 6, method 600 requires no particular ordering between acts 604-606. As such, depending on implementation, these acts might be performed serially (in either order) or in parallel. In any of acts 604-606, the identifications could be based on an analysis of trace data (e.g., trace data streams 401) and/or index data (e.g., additional data streams 406). Additionally, while acts 604-606 are shown within act 602, any of these acts might be performed before act 602 beings (i.e., before receipt of a query), such as during the generation of index data.

In embodiments, act 604 comprises the lifetime identification component 116a determining a beginning of the lifetime of the memory-backed object and determining an ending of the lifetime of the memory-backed object. For example, using the techniques discussed above in connection with FIG. 1B, the lifetime identification component 116a can determine, from the trace 114, when the lifetime of a memory-backed object began, and when it ended.

For example, the lifetime identification component 116a might rely on allocation primitives. As such, determining the beginning of the lifetime of the memory-backed object could be based on identifying a call to an allocation primitive, and determining the ending of the lifetime of the memory-backed object could be based on identifying a call to a deallocation primitive. In another example, the lifetime identification component 116a might rely on stack allocations. As such, determining the beginning of the lifetime of the memory-backed object could be based on identifying an allocation of a stack frame, and determining the ending of the lifetime of the memory-backed object could be based on identifying a deallocation of the stack frame. In another example, the lifetime identification component 116a might rely on memory management by a managed runtime. As such, determining the beginning of the lifetime of the memory-backed object could be based on identifying a managed runtime allocation, and determining the ending of the lifetime of the memory-backed object could be based on identifying a managed runtime deallocation, such as by a garbage collector. In another example, the lifetime identification component 116a might rely on memory reclassification, such as with a placement new( ) As such, determining the beginning of the lifetime of the memory-backed object could be based on identifying a reclassification of one or more memory locations, and determining the ending of the lifetime of the memory-backed object could be based on identifying a destruction of the memory-backed object. In another example, the lifetime identification component 116a might track whether or not an object is contained by another object. In this case, determining the ending of the lifetime of the memory-backed object could be based on identifying an end of a lifetime of a parent container. In any of these situations, the ending of a lifetime might alternatively be based on identifying an ending of a trace prior to a deallocation.

In embodiments, act 605 comprises the coverage identification component 116b identifying a set of a plurality of associations that are represented by the handle, the set of associations identifying a plurality of memory addresses that were covered by the memory-backed object over the lifetime of the memory-backed object, each association representing at least (i) a memory address that was covered by the memory-backed object during the lifetime of the memory-backed object, and (ii) an execution time during lifetime of the memory-backed object at which the memory address was covered by the memory-backed object. For example, using the techniques discussed above in connection with FIG. 1B, the coverage identification component 116b can identify which memory addresses the memory-backed object covered during its lifetime. This may, for example, be represented by associations (e.g., tuples) between one or more memory addresses and one or more execution time points during which these memory addresses were covered by the memory-backed object.

In embodiments, act 606 comprises the handle identification component 116c identifying a handle for logically representing memory covered by the memory-backed object over a lifetime of the memory-backed object in the prior execution of the entity. For example, using the techniques discussed above in connection with FIG. 1B, the handle identification component 116c can identify a handle to the memory-backed object identified in act 602. This handle can logically represent this memory-backed object at any point in its lifetime, regardless of the particular memory allocated to the memory-backed object during that point in its lifetime.

Returning to act 603, while a vast variety of queries are available, they generally rely on performing a query against the handle to the memory-backed object. In embodiments processing a query against the memory-backed object might include the query component 117 processing, at least in part, a query against the handle. Since, as discussed, a handle logically represents memory covered by an object corresponding to the handle, the handle can logically represent a set of memory/execution time associations generated by the coverage identification component 116b. Thus, in embodiments, a query might include a least one query condition based on an execution time and processing the query might include comparing the execution time in the query to one or more execution times represented in the set of associations. Notably, the handle acted on in act 603 might be an intermediary query result, and even this memory-backed object itself, might be an intermediate query result. Thus, the memory-backed object and/or the handle might be identified based, at least in part, on processing the query.

Method 600 also includes an act 607 of formulating a query response. For example, the query component 117 can formulate query results, and the output component 118 can output those results at a user interface (i.e., UI output component 118a) and/or via an API output (i.e., API output component 118b). Depending on the query received in act 601, formulating a query response can take a variety of forms. For example, formulating a response to the query could include identifying a first traced memory access that was targeted to at least one of the plurality of memory addresses represented in the set of associations during any execution time during which the at least one memory addresses was covered by the memory-backed object during the lifetime of the memory-backed object in the prior execution of the entity. In other words, formulating a response to the query could include identifying a memory access to a valid covered memory location during the lifetime of the memory-backed object. Formulating this type of query response could be based on, for example, processing a query that finds accesses to the memory-backed object, processing a query that finds inputs into the memory-backed object, processing a query that finds outputs from the memory-backed object, processing a query that finds places where was the memory-backed object was accessed, processing a query that finds places where the memory-backed object was modified, and the like.

As another example, formulating a response to the query could include identifying a second traced memory access, associated with the handle and corresponding to an execution time, the second traced memory access targeted to at least one of the plurality of memory addresses represented in the set of associations that was not valid for the handle at the execution time. In other words, formulating a response to the query could include identifying a memory access using a handle to the object that were not valid. Formulating this type of query response could be based on, for example, processing a query that finds uses after free( ) processing a query that determines if there was any access before the object's memory allocation (buffer underrun), processing a query that determines if there was there any access after the object's memory allocation (buffer overrun), processing a query that determines if an access was to padding, to determine if an access was to a gap, and the like.

As another example, formulating a response to the query could include identifying a third traced memory access comprising a read that was targeted to at least one of the plurality of memory addresses represented in the set of associations during any execution time during which the at least one memory addresses was covered by the memory-backed object during the lifetime of the memory-backed object in the prior execution of the entity, and prior to a write to the at least one of the one or more memory addresses when the at least one memory address was valid for the memory-backed object. In other words, formulating a response to the query could include identifying reads from uninitialized memory using the handle.

As another example, formulating a response to the query could include identifying that at least one of the one or more memory addresses was covered by the memory-backed object at a first execution time during the lifetime of the memory-backed object, but not at a second execution time during the lifetime of the memory-backed object. In other words, formulating a response to the query could include determining if a memory-backed object was moved in memory, if a memory-backed object changed its shape/layout in memory, etc.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

Embodiments of the present invention may comprise or utilize a special-purpose or general-purpose computer system that includes computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope. When introducing elements in the appended claims, the articles "a," "an," "the," and "said" are intended to mean there are one or more of the elements. The terms "comprising," "including," and "having" are intended to be inclusive and mean that there may be additional elements other than the listed elements.

What is claimed:

1. A method, implemented at a computer system that includes at least one processor, for processing a query against a lifetime of a memory-backed object based on an execution trace, the method comprising:
   identifying, from a trace of a prior execution of an entity, a memory-backed object that existed during the prior execution of the entity;
   identifying a handle for logically representing memory covered by the memory-backed object over a lifetime of the memory-backed object in the prior execution of the entity;
   identifying a set of a plurality of associations that are represented by the handle, the set of associations identifying a plurality of memory addresses that were covered by the memory-backed object over the lifetime of the memory-backed object, each association representing at least (i) a memory address that was covered by the memory-backed object during the lifetime of the memory-backed object, and (ii) an execution time during lifetime of the memory-backed object at which the memory address was covered by the memory-backed object;
   processing, at least in part, a query against the handle, the query including a least one query condition based on an execution time, processing the query including comparing the execution time in the query to one or more execution times represented in the set of associations; and
   formulating a response to the query.

2. The method of claim 1, further comprising:
   determining a beginning of the lifetime of the memory-backed object; and
   determining an ending of the lifetime of the memory-backed object.

3. The method of claim 2, wherein determining the beginning of the lifetime of the memory-backed object is based on identifying a call to an allocation primitive, and wherein determining the ending of the lifetime of the memory-backed object is based on identifying at least one of a call to a deallocation primitive or an end of the trace.

4. The method of claim 2, wherein determining the beginning of the lifetime of the memory-backed object is based on identifying an allocation of a stack frame, and wherein determining the ending of the lifetime of the memory-backed object is based on identifying at least one of a deallocation of the stack frame or an end of the trace.

5. The method of claim 2, wherein determining the beginning of the lifetime of the memory-backed object is based on identifying a managed runtime allocation, and wherein determining the ending of the lifetime of the memory-backed object is based on identifying at least one of a managed runtime deallocation or an end of the trace.

6. The method of claim 2, wherein determining the beginning of the lifetime of the memory-backed object is based on identifying a reclassification of one or more memory locations.

7. The method of claim 2, wherein determining the ending of the lifetime of the memory-backed object is based on identifying an end of a lifetime of a parent container.

8. The method of claim 1, wherein the memory-backed object and the handle are identified based, at least in part, on processing the query.

9. The method of claim 1, wherein the set of associations are identified from trace index data.

10. The method of claim 1, further comprising receiving the query, the query referencing the handle.

11. The method of claim 1, wherein formulating the response to the query includes at least one of:
    identifying a first traced memory access that was targeted to at least one of the plurality of memory addresses represented in the set of associations during any execution time during which the at least one memory addresses was covered by the memory-backed object during the lifetime of the memory-backed object in the prior execution of the entity;
    identifying a second traced memory access, associated with the handle and corresponding to an execution time, the second traced memory access targeted to at least one of the plurality of memory addresses represented in the set of associations that was not valid for the handle at the execution time;
    identifying a third traced memory access comprising a read that was targeted to at least one of the plurality of memory addresses represented in the set of associations during any execution time during which the at least one memory addresses was covered by the memory-backed object during the lifetime of the memory-backed object in the prior execution of the entity, and prior to a write to the at least one of the one or more memory addresses when the at least one memory address was valid for the memory-backed object; or
    identifying that at least one of the one or more memory addresses was covered by the memory-backed object at a first execution time during the lifetime of the memory-backed object, but not at a second execution time during the lifetime of the memory-backed object.

12. A computer system comprising:
    at least one processor; and
    at least one computer-readable medium having stored thereon computer-executable instructions that are executable by the at least one processor to cause the computer system to process a query against a lifetime of a memory-backed object based on an execution trace, the computer-executable instructions including instructions that are executable by the at least one processor to cause the computer system to perform at least the following:
    identify, from a trace of a prior execution of an entity, a memory-backed object that existed during the prior execution of the entity;
    identify a handle for logically representing memory covered by the memory-backed object over a lifetime of the memory-backed object in the prior execution of the entity;
    identify a set of a plurality of associations that are represented by the handle, the set of associations identifying a plurality of memory addresses that were covered by the memory-backed object over the lifetime of the memory-backed object, each association representing at least (i) a memory address that was covered by the memory-backed object during the lifetime of the memory-backed object, and (ii) an execution time during lifetime of the memory-backed object at which the memory address was covered by the memory-backed object;
    process, at least in part, a query against the handle, the query including a least one query condition based on an execution time, processing the query including comparing the execution time in the query to one or more execution times represented in the set of associations; and
    formulate a response to the query.

13. The computer system of claim 12, the computer-executable instructions also including instructions that are executable by the at least one processor to cause the computer system to:
- determine a beginning of the lifetime of the memory-backed object; and
- determine an ending of the lifetime of the memory-backed object.

14. The computer system of claim 13, wherein determining the beginning of the lifetime of the memory-backed object is based on identifying a call to an allocation primitive, and wherein determining the ending of the lifetime of the memory-backed object is based on identifying at least one of a call to a deallocation primitive or an end of the trace.

15. The computer system of claim 13, wherein determining the beginning of the lifetime of the memory-backed object is based on identifying an allocation of a stack frame, and wherein determining the ending of the lifetime of the memory-backed object is based on identifying at least one of a deallocation of the stack frame or an end of the trace.

16. The computer system of claim 13, wherein determining the beginning of the lifetime of the memory-backed object is based on identifying a managed runtime allocation, and wherein determining the ending of the lifetime of the memory-backed object is based on identifying at least one of a managed runtime deallocation or an end of the trace.

17. The computer system of claim 13, wherein determining the beginning of the lifetime of the memory-backed object is based on identifying a reclassification of one or more memory locations.

18. The computer system of claim 13, wherein determining the ending of the lifetime of the memory-backed object is based on identifying an end of a lifetime of a parent container.

19. The computer system of claim 12, wherein formulating the response to the query includes at least one of:
- identifying a first traced memory access that was targeted to at least one of the plurality of memory addresses represented in the set of associations during any execution time during which the at least one memory addresses was covered by the memory-backed object during the lifetime of the memory-backed object in the prior execution of the entity;
- identifying a second traced memory access, associated with the handle and corresponding to an execution time, the second traced memory access targeted to at least one of the plurality of memory addresses represented in the set of associations that was not valid for the handle at the execution time;
- identifying a third traced memory access comprising a read that was targeted to at least one of the plurality of memory addresses represented in the set of associations during any execution time during which the at least one memory addresses was covered by the memory-backed object during the lifetime of the memory-backed object in the prior execution of the entity, and prior to a write to the at least one of the one or more memory addresses when the at least one memory address was valid for the memory-backed object; or
- identifying that at least one of the one or more memory addresses was covered by the memory-backed object at a first execution time during the lifetime of the memory-backed object, but not at a second execution time during the lifetime of the memory-backed object.

20. A method, implemented at a computer system that includes at least one processor, for processing a query against a lifetime of a memory-backed object based on an execution trace, the method comprising:
- identifying, from a trace of a prior execution of an entity, a memory address that was used as part of the prior execution of the entity during at least one execution time;
- receiving a query against the memory address; and
- based on receiving the query against the memory address,
  - identifying at least one memory-backed object to which the memory address was associated during the at least one execution time;
  - identifying a handle for logically representing memory covered by the memory-backed object over a lifetime of the memory-backed object in the prior execution of the entity;
  - identifying a set of a plurality of associations that are represented by the handle, the set of associations identifying a plurality of memory addresses that were covered by the memory-backed object over the lifetime of the memory-backed object, each association representing at least (i) a memory address that was covered by the memory-backed object during the lifetime of the memory-backed object, and (ii) an execution time during lifetime of the memory-backed object at which the memory address was covered by the memory-backed object;
  - processing, at least in part, the query using the handle, the query including a least one query condition based on an execution time, processing the query including comparing the execution time in the query to one or more execution times represented in the set of associations; and
  - formulating a response to the query.

* * * * *